United States Patent
Cherukumudi et al.

(10) Patent No.: US 9,471,473 B1
(45) Date of Patent: Oct. 18, 2016

(54) ENVIRONMENTAL VALIDATION TOOL

(75) Inventors: Vijaykumar Cherukumudi, Overland Park, KS (US); Lesley Cranor, Overland Park, KS (US); David K. Fultz, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 2364 days.

(21) Appl. No.: 12/351,001

(22) Filed: Jan. 9, 2009

(51) Int. Cl.
  G06F 9/44 (2006.01)
  G06F 11/36 (2006.01)
  G06F 11/34 (2006.01)

(52) U.S. Cl.
  CPC ........ G06F 11/3688 (2013.01); *G06F 11/3466* (2013.01)

(58) Field of Classification Search
  CPC .................. G06F 11/3688; G06F 11/3466
  USPC .................................................. 717/124, 131
  See application file for complete search history.

(56) References Cited

U.S. PATENT DOCUMENTS

| | | | |
|---|---|---|---|
| 6,804,818 B1* | 10/2004 | Codella et al. | 719/315 |
| 2003/0009476 A1* | 1/2003 | Fomenko et al. | 707/103 R |
| 2004/0019798 A1* | 1/2004 | Ishii | 713/193 |
| 2005/0144277 A1* | 6/2005 | Flurry et al. | 709/225 |
| 2005/0262495 A1* | 11/2005 | Fung et al. | 717/170 |
| 2005/0267918 A1* | 12/2005 | Gatev et al. | 707/203 |
| 2006/0206890 A1* | 9/2006 | Shenfield et al. | 717/174 |
| 2007/0074148 A1* | 3/2007 | Morgan | 717/101 |
| 2007/0089013 A1* | 4/2007 | Qiu et al. | 714/742 |
| 2007/0143629 A1* | 6/2007 | Hardjono et al. | 713/189 |
| 2007/0169015 A1* | 7/2007 | Seelig et al. | 717/136 |
| 2007/0192657 A1* | 8/2007 | Laurent et al. | 714/720 |
| 2007/0220507 A1* | 9/2007 | Back et al. | 717/170 |
| 2007/0288903 A1* | 12/2007 | Manglik et al. | 717/124 |
| 2008/0045342 A1* | 2/2008 | Crowder et al. | 463/42 |
| 2008/0140696 A1* | 6/2008 | Mathuria | 707/102 |

OTHER PUBLICATIONS

"CodeCharge Studio 4 User's Guidge" © 2000-2008. 345 pages.*

* cited by examiner

*Primary Examiner* — Anna Deng

(57) ABSTRACT

A system is provided for environment validation. The system includes a user interface, a repository, and a validation tool. The repository includes environment component information. The validation tool accesses environment component information in the repository and validates each keystore associated with an environment. The validation tool also validates each port associated with the environment and validates each database associated with the environment. Additionally, the validation tool validates each message service associated with the environment and validates each interface associated with the environment. Furthermore, the validation tool outputs results of validating each environment component to the user interface.

19 Claims, 3 Drawing Sheets

ENVIRONMENTAL VALIDATION TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An application is computer software that employs the capabilities of a computer to perform a task for a computer user. Applications include computer executable code that is derived from computer source code files. An application may also include configuration files and support files for customizing the operation of the software. An enterprise may test and use a variety of computer applications, such as purchased or leased applications that have been developed externally, applications developed by the enterprise for internal use, and applications developed by the enterprise for external use.

Although the process of developing, testing, and using applications for simple programs may consist of a single file being compiled, the computer source code for complex software may consist of many files that may be configured in different ways to produce application versions customized specifically for each environment in which the application may execute. The word environment may refer to both a hardware system and a software system that together provide facilities for developing, testing, and/or using applications, such as the configuration of the hardware components, operating system, and enabling programs in which an application executes. The word environment may also specifically refer to the software components that promote developing, testing, and/or using applications. Therefore, development and test environments may be created that simulate the production environments in which an application may execute for developing, testing, and using the application. The process of creating environments from environment components, and both developing and testing applications in the environments may be complicated and time consuming, often requiring weeks of intensive work.

SUMMARY

In some embodiments, a system is provided for environment validation. The system includes a user interface, a repository, and a validation tool. The repository includes environment component information. The validation tool accesses environment component information in the repository and validates each keystore associated with an environment. The validation tool also validates each port associated with the environment and validates each database associated with the environment. Additionally, the validation tool validates each message service associated with the environment and validates each interface associated with the environment. Furthermore, the validation tool outputs results of validating each environment component to the user interface.

In some embodiments, a computer implemented method is provided for environment validation. Environment component information is accessed in a repository. At least one keystore associated with an environment is validated. At least one port associated with the environment is validated. At least one database associated with the environment is validated. At least one message service associated with the environment is validated. At least one interface associated with the environment is validated. Results of validating each environment component are output to a user interface.

In some embodiments, a method is provided for environmental validation. Each component in a baseline environment is identified. A list of each component is stored as environment component information in a repository. The environment component information is accessed in the repository. Each environment component associated with a target environment is validated based on the environment component information. Results of validating each environment component are stored to a file. The file is output to a user interface.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
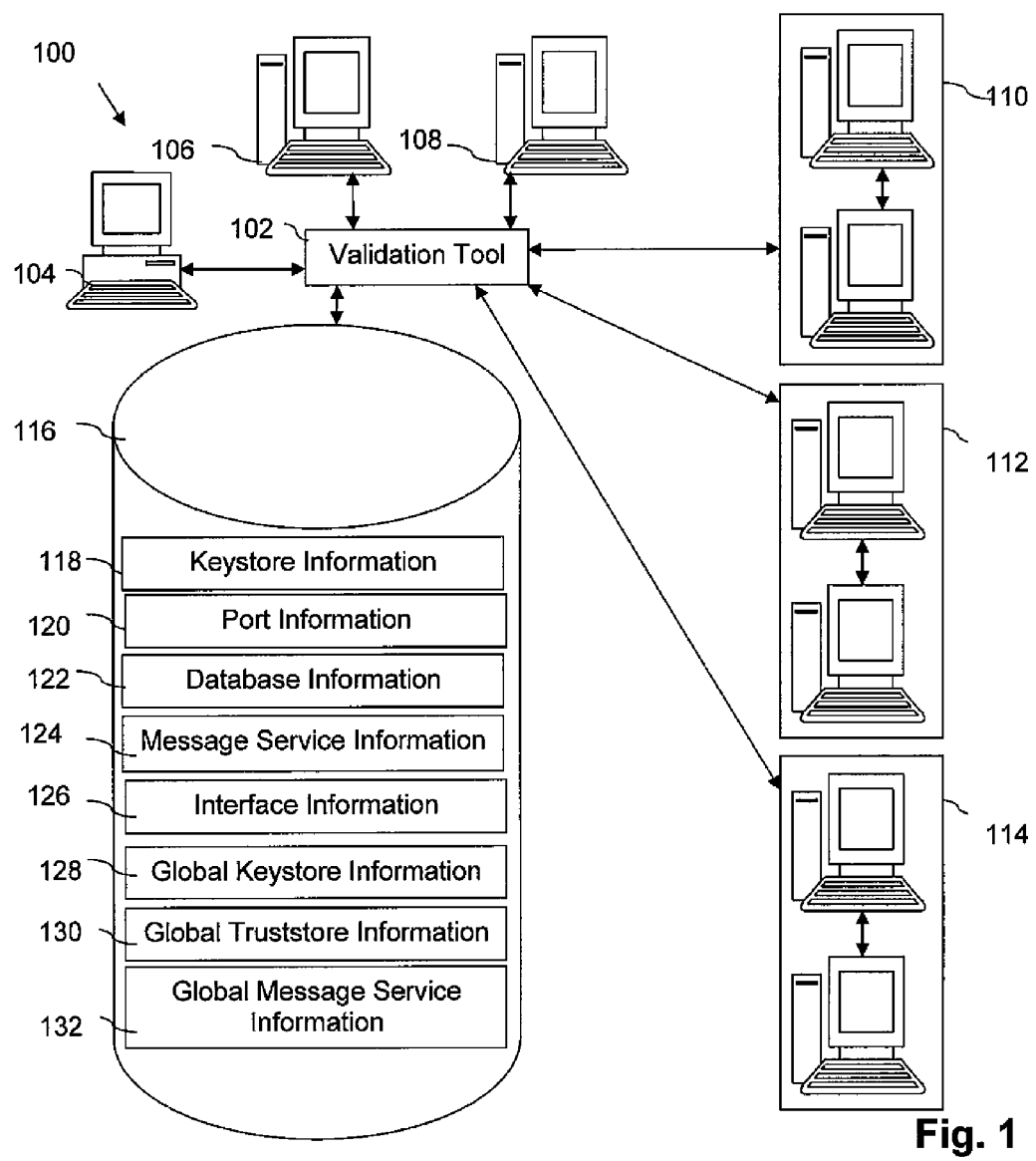
FIG. 1 shows a block diagram of a system for environmental validation according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

An application developer may assume that an environment created for testing an application is valid for testing the application, only to discover an environmental problem after application testing eventually identifies problems with a component in the environment. Even if the application developer manually validates some environmental components, other environmental components may still cause problems for the application testing, problems that the developer may initially attribute to the application being tested. If an environment has been validated based on manual validations and application testing on one day, the application developer may be incorrect in assuming that the same environment is still valid for testing the same application on the next day because of the transitory nature and/or instability of test environments.

In some embodiments of the disclosure, a system is provided for environment validation, where the system includes a user interface, a validation tool, and a repository of environment component information. Once components have been identified in a baseline environment that is properly developing, testing, or executing applications, a list of these components is stored in the repository. The validation tool validates each component in a target environment that may be used for developing or executing an application based on environment component information accessed from the repository. Rather than determining the validity of the target environment through testing an application in the target environment, the validation tool validates environment components at low levels, including the validation of computer ports, databases, message services, interfaces, and keystores, which store public key/private key pairs used for client identity. The validation tool outputs results of validating each environment component to the user interface to inform system users, such as the application developer and environment technicians, whether or not the target environment is valid for the system users' intended use. The system users may take steps to correct any of the low level components identified as invalid by the validation tool, thereby enabling the target environment to become valid for its intended use.

Typically, the validation tool may be used to validate a test environment before an application is tested. Additionally, the validation tool may be used to validate a production environment on a periodic basis, such as hourly or daily, to detect sources of potential problems before the potential problems are detected or become actual problems or before too much invalid testing has occurred. Furthermore, the validation tool may be used to validate a production environment to identify the source of an existing problem in response to a request to identify the source of the existing problem.

Turning now to FIG. 1, a block diagram of a system 100 for environmental validation is shown according to some embodiments of the present disclosure. The system 100 includes a validation tool 102, a user interface 104, environments 106-114 and a repository 116. The validation tool 102 may validate the environments 106-114 based on environment component information accessed from the repository 116, store results of validating each environment component to a file, and output the validation results to the user interface 104. The validation tool 102 may be linked to the environments 106-114 via a network.

The validation tool 102 may execute a different application to validate each environment component in a target environment of the environments 106-114. The validation tool 102 may be implemented by a general purpose computer, which is described in greater detail in reference to FIG. 3. Although some embodiments describe the validation tool 102 as electronically taking certain actions or processing certain data, in other embodiments these actions or activities may be accomplished manually, such as by a user requesting validation of one of the environments 106-114. In other embodiments, these actions may be accomplished partially manually and partially by the validation tool 102. The validation tool 102 may include an application program interface, such as a web portal, that may be accessed via the user interface 104.

The user interface 104 may be used to identify each component in a baseline environment, which is not depicted in FIG. 1, but which may be substantially similar to any of the environments 106-114. A user of the system 100 may request the validation tool 102, via the user interface 104, to store a list of each component identified in the baseline environment as environment component information in the repository 116. A user of the system 100 may employ the user interface 104 to request the validation tool 102 to validate one of the environments 106-114.

The environments 106-114 may be a single server, a group of servers, or a cluster of servers. The environments 106-114 may install an application to be tested, or the environments 106-114 may use a uniform resource locater (URL) to reference, via a communications network, the application to be tested. The system 100 depicts five environments: a development environment 106, a system test environment 108, a clustered test environment 110, a clustered production environment 112, and a failover environment 114. These five environments are shown as an illustrative example, as the system 100 may include any number and type of environments 106-114. The development environment 106 is the hardware, operating system, and enabling programs on which an application may be created. The system test environment 108 is the hardware, operating system, and enabling programs on which an application may be evaluated. The clustered test environment 110 is a clustered environment, which is the hardware, operating system, and enabling programs for a group of loosely coupled computers that work together closely on which the application may be evaluated. In contrast to a clustered environment, a non-clustered environment is the hardware, operating system, and enabling programs for a single computer on which the application is evaluated, such as the system test environment 108. The clustered production environment 112 is the hardware, operating system, and enabling programs for a group of loosely coupled computers that work together closely on which the application may be executed to achieve the goals of the application. The failover environment 114 is the hardware, operating system, and enabling programs on which the application may be executed upon the abnormal termination of a production environment, such as the clustered production environment 112.

The repository 116 contains environment component information 118-132, including keystore information 118, port information 120, database information 122, message service information 124, and interface information 126. The environment component information 118-132 may also include global keystore information 128, global truststore information 130, and global message service information 132. Each of the environment component information 118-132 includes data for validating at least one of the environments 106-114.

The keystore information 118 is accessed by the validation tool 102 to validate the target environment's keystores. The validation tool 102 uses the keystore information 118 to ensure the target environment's keystores exist, to open the target environment's keystores, to ensure the target environment's keystore passwords are valid, to ensure the target environment's keystores are properly formatted, and to report any of the target environment's expired entries. If the target environment uses a key to communicate with a client computer on Monday, and the key expires on Tuesday, an application tester may not be able to determine why a tested application fails to communicate with the client computer on Wednesday. Therefore, the validation tool 102 reports on the target environment's expired keys because accurate testing of applications may depend upon the target environment having valid keystores. This may save time and effort seeking for causes for a failure in places other than expiration of a key and/or a digital certificate.

The port information 120 is accessed by the validation tool 102 to validate the target environment's ports. The validation tool 102 uses the port information 120 to attempt to connect to the target environment's ports and determine any connection errors associated with a timeout, a connection refused, and/or an exception. The port information 120 may identify a host computer for each of the target environment's ports to enable the validation tool 102 to validate each port. For example, the port information 120 may identify an FTP server listening on port 21, a telnet server listening on port 23, or an application process running on some other port. Accurate testing of applications may depend upon the target environment having valid port connections.

The database information 122 is accessed by the validation tool 102 to validate the target environment's databases. The validation tool 102 uses the database information 122 to ensure that connectivity exists to the target environment's databases, to ensure the target environment's databases are on-line, to ensure an optionally provided username is valid for the target environment's databases, and to ensure an optionally provided password is valid for the target environment's databases. The validation tool 102 may also process any provided database command to ensure that proper rights exist for any provided username, and to ensure existence of expected data, expected metadata, and/or expected data states. Accurate testing of applications may depend upon the target environment having valid database connections.

The message service information 124 is accessed by the validation tool 102 to validate the target environment's message services. The validation tool 102 uses the message service information 124 to ensure connectivity exists to the target environment's message services, to ensure the target environment's message services are on-line, and to ensure both authentication and authorization for the target environment's message services are valid. The validation tool 102 may also ensure that connectivity to the target environment's message queues exist and ensure the target environment's message queues are configured for sending and/or receiving. Accurate testing of applications may depend upon the target environment having valid message services connections.

The interface information 126 is accessed by the validation tool 102 to validate the target environment's interfaces. The validation tool 102 uses the interface information 126 to ensure connectivity exists to the target environment's interfaces, to ensure authentication and authorization for the target environment's interfaces are valid, and to ensure the target environment's interfaces are on-line. The validation tool 102 may also send provided test data to the target environment's interfaces to ensure the target environment's interfaces are processing requests and responding. Additionally, the validation tool 102 may apply provided patterns to the target environment's interfaces to ensure the target environment's interfaces respond as expected. Accurate testing of applications may depend upon the target environment having valid interface connections.

The global keystore information 128 is accessed by the validation tool 102 to validate the target environment's global keystore. The validation tool 102 uses the global keystore information 128 to validate global public key/private key pairs used for client identity during the target environment's secure sockets layer communications. In comparison to the global keystore information 128, the keystore information 118 contains a list of keystores that contain either client identities or trusted certificate entries to check date validity once one of the keystores is located. Accurate testing of applications may depend upon the target environment having valid global keystores.

The global truststore information 130 is accessed by the validation tool 102 to validate the target environment's global truststore. The validation tool 102 uses the global truststore information 130 to validate the target environment's trusted certificates entries used for server certificate trust validation during the target environment's secure sockets layer communications. Accurate testing of applications may depend upon the target environment having valid truststores.

The global message service information 132 is accessed by the validation tool 102 to validate the target environment's global message service. The validation tool 102 uses the global message service information 132 to locate all global message service objects through the same message service specified by a queue connection factory using a uniform resource locator and a message service provider. In comparison to the global message service information 132, the message service information 124 contains a list of message service configuration information, including queues, for determining messaging availability. Accurate testing of applications may depend upon the target environment having valid global message service connections.

Figure 2:
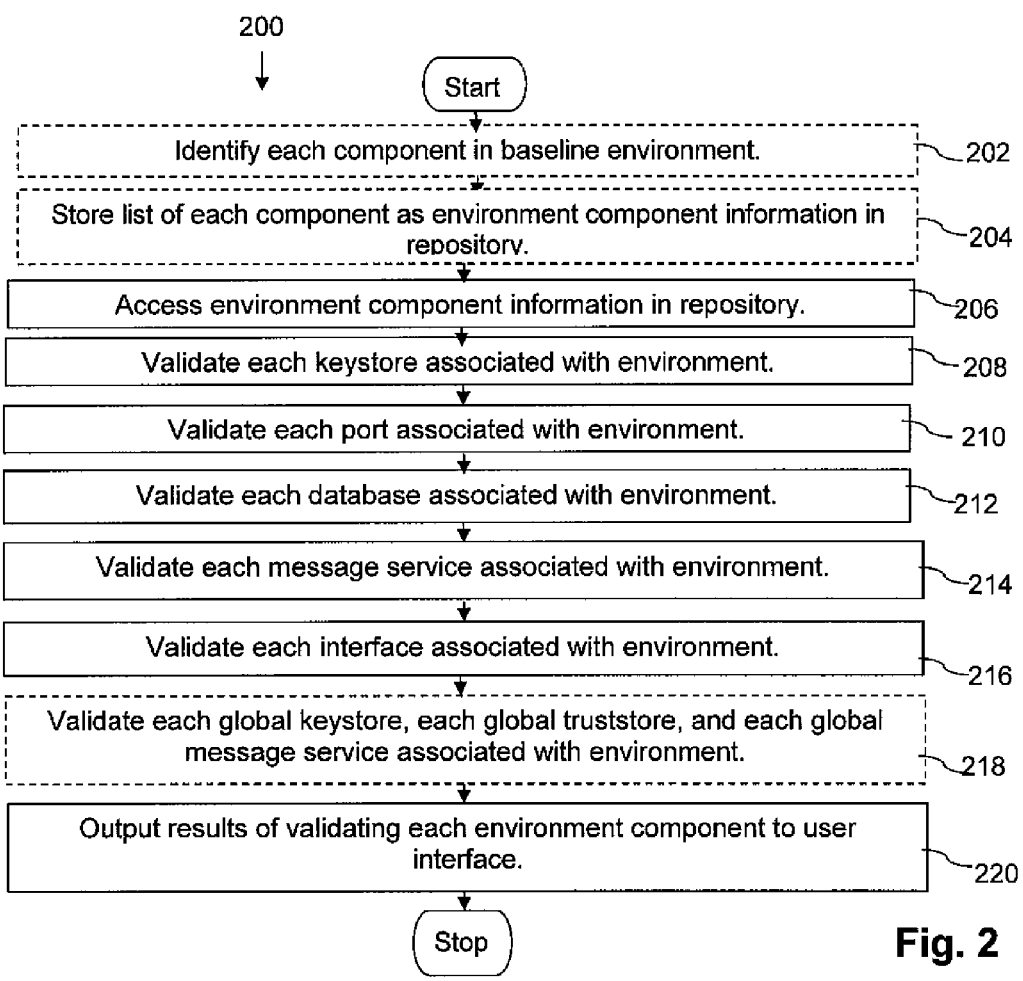
FIG. 2 shows a flowchart of a method for environmental validation according to some embodiments of the present disclosure.

FIG. 2 shows a flowchart of a method 200 for environmental validation according to some embodiments of the present disclosure. The system 100 can execute the method 200 to validate each component in a target environment and output the results of validating each environment component.

In box 202, each component is optionally identified in a baseline environment. For example, a user employs the user interface 104 to identify each component in the baseline environment, which is not depicted in FIG. 1, but which may be substantially similar to any of the environments 106-114.

In box 204, a list of each component is optionally stored as environment component information in a repository. For example, the user stores the list of each component in the baseline environment as the environment component information 118-132.

In box 206, environment component information is accessed in the repository. For example, the validation tool 102 accesses the environment component information 118-132 to validate the system test environment 108.

In box 208, each keystore associated with environment is validated. For example, the validation tool 102 validates each keystore associated with the system test environment 108 based on the keystore information 118.

In box 210, each port associated with the environment is validated. For example, the validation tool 102 validates each port associated with the system test environment 108 based on the port information 120.

In box 212, each database associated with the environment is validated. For example, the validation tool 102 validates each database associated with the system test environment 108 based on the database information 122.

In box 214, each message service associated with the environment is validated. For example, the validation tool 102 validates each message service associated with the system test environment 108 based on the message service information 124.

In box 216, each interface associated with the environment is validated. For example, the validation tool 102 validates each interface associated with the system test environment 108 based on the interface information 126.

In box 218, each global keystore, each global truststore, and each global message service associated with the environment is optionally validated. For example, the validation tool 102 validates each global keystore, global truststore, and global message service associated with the system test environment 108 based on the global keystore information 128, the global truststore information 130, and the global message service information 132.

In box 220, results of validating each environment component is output to the user interface. For example, the validation tool 102 outputs results of validating each environment component to the user interface 104.

Figure 3:
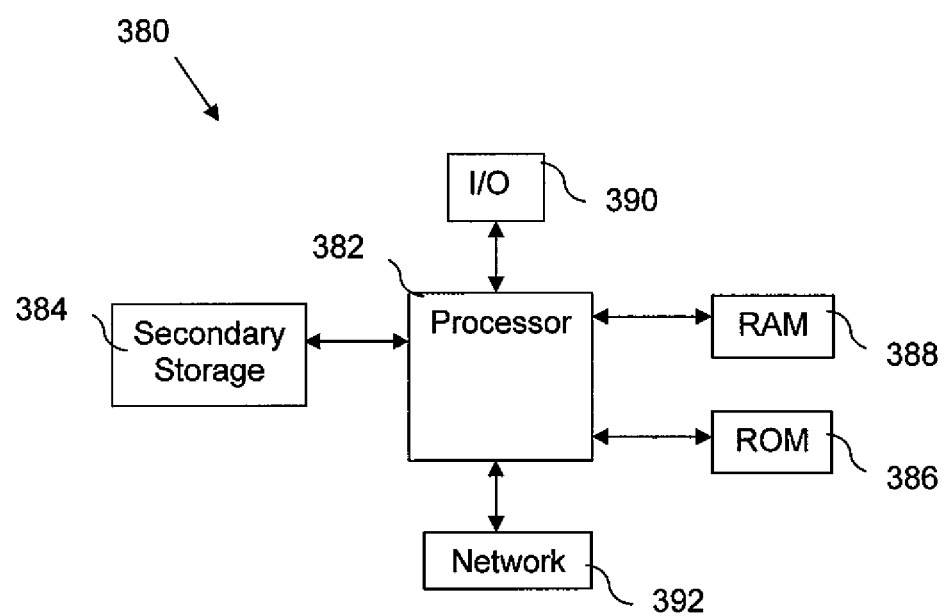
FIG. 3 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A system for environment validation, comprising:
a user interface;
a processor;
a repository comprising environment component information, wherein the environment component information comprises information for an application testing environment, and wherein the application testing environment is an environment created for testing applications; and
a validation tool that, when executed by the processor, validates the application testing environment prior to application testing by:
accessing the environment component information in the repository;
validating each keystore associated with the application testing environment, wherein validating each key- store comprises ensuring each keystore exists, opening each keystore, and ensuring each keystore password is valid;

validating each port associated with the application testing environment, wherein validating each port comprises connecting to each port and determining connection errors associated with at least one of a timeout, a connection refused, and an exception;

validating each database associated with the application testing environment, wherein validating each database comprises ensuring that connectivity exists to each database and ensuring each database is on-line;

validating each message service associated with the application testing environment, wherein validating each message service comprises ensuring connectivity exists to each message service and ensuring each message service is on-line;

validating each interface associated with the application testing environment, wherein validating each interface comprises ensuring connectivity exists to each interface and ensuring authentication and authorization are valid; and outputting the results of validating each application testing environment component to the user interface.

2. The system of claim 1, wherein the validation tool further executes in at least one of a production environment on a periodic basis and a production environment in response to a request to identify a source of a problem.

3. The system of claim 1, wherein validating each keystore associated with the application testing environment further comprises ensuring each keystore is properly formatted and reporting any expired entries.

4. The system of claim 1, wherein validating each database associated with the application testing environment further comprises ensuring an optionally provided username is valid and ensuring an optionally provided password is valid.

5. The system of claim 4, wherein validating each database associated with the application testing environment further comprises processing any provided database command to ensure that proper rights exist for any provided username and ensuring existence of at least one of expected data, expected metadata, and expected data states.

6. The system of claim 1, wherein validating each message service associated with the application testing environment further comprises ensuring both authentication and authorization are valid.

7. The system of claim 6, wherein validating each message service associated with the application testing environment further comprises ensuring that connectivity to each message queue associated with the message service exists and ensuring each message queue is configured for at least one of sending and receiving.

8. The system of claim 1, wherein validating each interface associated with the application testing environment further comprises ensuring each interface is on-line.

9. The system of claim 8, wherein validating each interface associated with the application testing environment further comprises sending provided test data to each interface to ensure each interface is processing requests and responding.

10. The system of claim 9, wherein validating each interface associated with the application testing environment further comprises applying provided patterns to each interface to ensure each interface responds as expected.

11. The system of claim 1, wherein the validation tool further tests the application testing environment prior to application testing by validating each global keystore associated with the application testing environment, validating each global truststore associated with the application testing environment, and validating each global message service associated with the application testing environment.

12. The system of claim 11, wherein validating each global keystore associated with the application testing environment comprises validating public key/private key pairs used for client identity during secure sockets layer communications.

13. The system of claim 11, wherein validating each global truststore associated with the application testing environment comprises validating trusted certificates entries used for server certificate trust validation during secure sockets layer communications.

14. The system of claim 11, wherein validating each global message service associated with the application testing environment comprises locating all message service objects through the same message service specified by a queue connection factory using a uniform resource locator and a message service provider.

15. The system of claim 1 wherein the validation tool executes a different one of a plurality of applications to validate each environment component.

16. A computer implemented method for environment validation, comprising:

accessing environment component information in a repository, wherein the environment component information comprises information for an application testing environment, wherein the application testing environment is an environment created for testing applications;

validating, by a validation tool, a plurality of environment components associated with the application testing environment prior to testing an application in the application testing environment, wherein the validating comprises:

validating, by a validation tool, at least one keystore associated with the application testing environment, wherein validating the at least one keystore comprises ensuring that the at least one keystore exists, opening the at least one keystore, and ensuring that a keystore password is valid;

validating, by the validation tool, at least one port associated with the application testing environment, wherein validating the at least one port comprises connecting to the at least one port and determining connection errors associated with at least one of a timeout, a connection refused, and an exception;

validating, by the validation tool, at least one database associated with the application testing environment, wherein validating the at least one database comprises ensuring that connectivity exists to the at least one database and ensuring that the at least one database is on-line;

validating, by the validation tool, at least one message service associated with the application testing environment, wherein validating the at least one message service comprises ensuring connectivity exists to the at least one message service and ensuring that the at least one message service is on-line;

validating, by the validation tool, at least one interface associated with the application testing environment, wherein validating the at least one interface comprises ensuring connectivity exists to the at least one interface and ensuring authentication and authorization are valid; and outputting, by the validation tool, results of validating each of the plurality of environment components to a user interface.

17. The computer implemented method of claim 16, wherein environment component information comprises the at least one keystore associated with the application testing environment, the at least one port associated with the application testing environment, the at least one database associated with the application testing environment, the at least one message service associated with the application testing environment, and the at least one interface associated with the application testing environment.

18. A computer implemented method for environment validation, comprising:
 identifying each component in a baseline environment;
 storing a list of each component as environment component information in a repository;
 accessing the environment component information in the repository;
 validating, by a validation tool, each environment component associated with an application testing environment based on the environment component information prior to testing an application in the application testing environment, wherein the application testing environment is an environment created for testing applications, and wherein the validating each environment component comprises:
  validating, by the validation tool, at least one keystore associated with the application testing environment, wherein validating the at least one keystore comprises ensuring that the at least one keystore exists, opening the at least one keystore, and ensuring that a keystore password is valid;
  validating, by the validation tool, at least one port associated with the application testing environment, wherein validating the at least one port comprises connecting to the at least one port and determining connection errors associated with at least one of a timeout, a connection refused, and an exception;
  validating, by the validation tool, at least one database associated with the application testing environment, wherein validating the at least one database comprises ensuring that connectivity exists to the at least one database and ensuring that the at least one database is on-line;
  validating, by the validation tool, at least one message service associated with the application testing environment, wherein validating the at least one message service comprises ensuring connectivity exists to the at least one message service and ensuring that the at least one message service is on-line;
  validating, by the validation tool, at least one interface associated with the application testing environment, wherein validating the at least one interface comprises ensuring connectivity exists to the at least one interface and ensuring authentication and authorization are valid;
 storing results of validating each environment component to a file; and
 outputting the file to a user interface.

19. The computer implemented method of claim 18 wherein the target environment is one of a server, a group of servers, and a cluster of servers.

* * * * *